United States Patent [19]

Ekanayake et al.

[11] Patent Number: 5,427,806

[45] Date of Patent: Jun. 27, 1995

[54] PROCESS FOR MAKING A STABLE GREEN TEA EXTRACT AND PRODUCT

[75] Inventors: Athula Ekanayake; Sanford T. Kirksey; Edmund P. Pultinas, Jr., all of Cincinnati, Ohio

[73] Assignee: The Procter & Gamble Company, Cincinnati, Ohio

[21] Appl. No.: 287,013

[22] Filed: Aug. 8, 1994

[51] Int. Cl.$^6$ ............................................. A23F 3/18
[52] U.S. Cl. ................................. 426/330.3; 426/597; 426/546
[58] Field of Search ...................... 426/597, 546, 330.3

[56] References Cited

U.S. PATENT DOCUMENTS

| | | |
|---|---|---|
| 2,891,865 | 6/1959 | Seltzer et al. |
| 2,902,368 | 9/1959 | Seltzer et al. |
| 2,927,860 | 3/1960 | Seltzer et al. |
| 3,113,028 | 12/1963 | Cooper et al. |
| 3,598,608 | 8/1971 | Ganiaris. |
| 3,911,145 | 10/1975 | Marion .................................. 426/597 |
| 3,950,553 | 4/1976 | Gasser et al. ......................... 426/262 |
| 4,004,038 | 1/1977 | Wickremasinghe ................. 426/422 |
| 4,051,267 | 9/1977 | Jongeling ............................. 426/330.3 |
| 4,135,001 | 1/1979 | Edmonds et al. ..................... 426/250 |
| 4,156,024 | 5/1979 | Husaini ................................. 426/257 |
| 4,440,796 | 4/1984 | Lunder et al. ........................ 426/597 |
| 4,472,441 | 9/1984 | Clark et al. .......................... 426/387 |
| 4,539,216 | 9/1985 | Tse ...................................... 426/597 |
| 4,680,193 | 7/1987 | Lunder et al. ........................ 426/597 |
| 4,717,579 | 1/1988 | Vietti et al. .......................... 426/597 |
| 4,748,033 | 5/1988 | Syfert et al. ......................... 426/330.3 |
| 4,851,252 | 7/1989 | Greither et al. ..................... 426/599 |
| 4,935,256 | 6/1990 | Tsai ..................................... 426/330.3 |
| 4,946,701 | 8/1990 | Tsai et al. ............................ 426/597 |
| 5,198,259 | 3/1993 | Hoogstad ............................. 426/435 |

FOREIGN PATENT DOCUMENTS

| | | |
|---|---|---|
| 0464919A1 | 1/1992 | European Pat. Off. |
| 5-236876 | 9/1993 | Japan. |
| 5-236877 | 9/1993 | Japan. |

OTHER PUBLICATIONS

Esselen, Jr. et al., "d-Isoascorbic Acid as an Antioxidant", Industrial and Engineering Chemistry, vol. 37, No. 3, (Mar., 1945), pp. 295–299.

Bauernfeind et al. "*Food Processing with Added Ascorbic Acid, XVI. L-Ascorbic Acid vs Erythorbic Acid*", Advances in Food Research, vol. 18, Academic Press, NY (1970), pp. 220–236, 297–304.

Moore, Edwin Lewis, "*An Investigation of the Factors Involved in the Deterioration of Glass-Packed Orange Juice*", Thesis submitted for degree of Doctor of Philosophy, (May, 1942), pp. 6–30.

Katayama et al., "*The Effects of Adding D-Iso-Ascorbic Acid to Fruit Juice*", Kanzume Jiho, vol. 42, No. 10 (1963), pp. 1–15.

Borenstein, B., "*The Comparative Properties of Ascorbic Acid and Erythorbic Acid*", Food Technology, Nov., 1965, pp. 115–117.

Frank, J. N.; "*Everybody Wins with Iced Tea*"; Beverage Industry; vol. 11; 1993; pp. 8–10.

Pintauro, N. D.; "*Tea and Soluble Tea Products Manufacture*"; Food Technology Review; Noyes Data Corp.; No. 38; 1977; pp. 82–85.

*Primary Examiner*—Joseph Golian
*Attorney, Agent, or Firm*—Rose Ann Dabek

[57] ABSTRACT

A process for the production of green tea extracts is disclosed comprising the steps of (a) extracting tea materials with an acidified aqueous solution comprising erythorbic acid or ascorbic acid and citric acid and mixtures thereof at specified ratios, (b) separating extract from residual tea material (c) mixing the extract containing solution with gelatin, and (d) separating the precipitates formed under a nitrogen blanket. The resultant tea extracts are stable against precipitation, have reduced bitter and astringent flavors, low levels of polymerized or oxidized flavanols and resist browning. The extracts are especially suitable for use in beverages with added colorant where brown color is not desired.

21 Claims, No Drawings

PROCESS FOR MAKING A STABLE GREEN TEA EXTRACT AND PRODUCT

FIELD OF INVENTION

The present invention relates to a process for preparing green tea extracts having the color and flavor suitable for incorporating into non-tea beverage matrixes.

Background

The extraction of tea material is well known in the art. For example green tea and black tea are typically extracted with hot or cold water to form a dilute extract containing soluble tea solids. The extract is concentrated to form a concentrated extract which is sold in frozen, refrigerated or dried form.

Black tea solids are typically used in tea containing beverages for flavor reasons and because they can be made stable by known processes. In particular green tea extracts are very unstable. Green tea contains high levels of unoxidized flavanols and black tea contains low levels of unoxidized flavanols and high levels of oxidized flavanols.

When green tea extract is subjected to temperature changes, oxygen, and other conditions encountered during distribution, the flavanols oxidize and react with each other and with other materials, such as, caffeine and protein, to form larger and heavier complexes which precipitate out. Beverages containing these flavanols, yields a beverage that turns brown with time. The beverage becomes cloudy, turbid and develops a visible precipitate in a few days.

Attempts have been made to remove the complexes from the tea extract. These methods include changing processing conditions, especially temperature to cause precipitation, followed by centrifugation, filtration, and removal of the precipitate. Other methods include suspending and stabilizing the oxidized flavanols, see for example, U.S. Pat. No. 4,051,261 to Jongeling, issued Sep. 27, 1977. Still other methods include using chemical and enzymatic agents to solubilize the insoluble components, or to extract the tea leaf using solvents so that only the unoxidized flavanols are extracted, but over time oxidation of the flavanols occur.

Even though majority of the precipitates can be removed using known processing methods the unoxidized flavanols, especially in unfermented and partially fermented tea, continue to oxidize and precipitate. Once the flavanols begin to oxidize the beverage containing these flavanols changes color, develops turbidity and shows visual signs of precipitation. Further, when the tea extract is incorporated into a beverage having a non-tea matrix (i.e. juice, punch, nectar), the beverages turn brown and muddy with time.

Discoloration and precipitation in tea containing beverages are not eye appealing and some consumers consider them to be distasteful and "old". Many children will not drink brown, turbid products. Further, if black tea is used, or if the flavanols begin to oxidize, the consumer does not receive the health benefits associated with green tea solids.

It has been found that tea extracts processed according to the present invention have lower levels of thearubigin and theaflavins, (which are associated with color and astringent flavor) and increased levels of thennine and unoxidized flavanols (i.e. catechin, epicatechin, and their derivatives) when compared to extracts prepared by conventional techniques (hot water extraction, precipitation, cold water extraction and the like). It has also been found that extracts processed according to the present invention do not cause cloudiness, browning in beverages and are resistant to precipitation. It has further been found that the process of the present invention improves the yield of flavanols, the flavor of the extract and stability of the extract even when low grade tea materials are used.

Accordingly, an object of the present invention is to provide green tea extracts containing tea solids, including caffeine, amino acids, especially higher levels of theanine, flavanols and very little oxidized or polymerized flavanols. This product is less astringent and less harsh in taste and provides all of the benefits of the green tea solid/caffeine mixtures.

Another object of the present invention is to provide processes for obtaining such green tea extracts.

Still another object of the present invention is to provide a stable green tea extract which does not become turbid or cause browning when incorporated into a shelf-stable beverage.

These and other objects will become apparent from the description herein.

All percentages are by weight unless otherwise indicated.

SUMMARY OF THE INVENTION

The present invention relates to a process for producing a tea extract comprising the steps of:

(a) contacting green tea materials with an aqueous acid solution comprising erythorbic acid or ascorbic acid and citric acid and mixtures thereof, at a ratio of tea materials to acid solution, of from about 1:7 to about 1:20, at a temperature of from about 40° C. to about 50° C. for a period of time sufficient to produce an aqueous extract containing from about 0.75% to about 2.5% by weight, soluble solids; the ratio of erythorbic or ascorbic acid to tea material being from about 1:6 to about 1:10, and the ratio of citric acid to tea material being from about 1:10 to about 1:34;

(b) separating the aqueous extract of step (a) from solid tea leaves residue;

(c) contacting the solid tea material residue of step (b) with acidified water comprising erythorbic or ascorbic acid, at a ratio of tea material to aqueous solution, of from about 1:7 to about 1:30, at a temperature of from about 40° C. to about 48° C. for a period of time sufficient to produce an aqueous extract containing from about 0.50% about 2.0% by weight, soluble solids;

(d) separating the aqueous extract of step (c) from the solid tea residue;

(e) mixing the extract at a temperature of from about 40° C. to about 50° C., with a 25% by weight gelatin solution, wherein the ratio of said gelatin solution to soluble solids is from about 1:2 to about 1:7;

(f) cooling the aqueous tea extract from step (e) to a temperature of from about 10° C. to about 20° C.;

(g) separating any solid precipitate from the cooled extract of step (f) under a inert gas blanket;

(h) optionally, concentrating the tea extract; and (i) optionally, drying the tea extract.

DETAILED DISCUSSION OF THE INVENTION

A. Definitions

As used herein, the term "comprising" means various components can be conjointly employed in the processes, tea products and beverages in the present invention. Accordingly, the term "comprising" encompasses the more restrictive terms "consisting essentially of" and "consisting of."

As used herein, the term "soluble tea solids" refers to the solid materials extracted from tea which are soluble in water. These solids include caffeine, flavanols, amino acids (especially rheanine), edible acids, and their salts, proteins, sugars and related materials. As used herein "soluble solids" or "solids" include solid materials soluble in water. These include soluble tea solids and added solid soluble material.

As used herein, the term "tea materials" or "tea solids" refers to green teas which includes materials or "tea solids" obtained from the genus Camellia including *C. sinensis* and *C. assaimica,* for instance, freshly gathered tea leaves, fresh green tea leaves that are dried immediately after gathering, fresh green tea leaves that have been heat treated before drying to inactivate any enzymes present, unfermented tea, instant green tea, partially fermented tea leaves and aqueous extracts of these leaves. Green tea materials are tea leaves, their extracts, tea plant stems and other plant materials which are related and which have not undergone substantial fermentation to create black teas. Other members of the genus Phyllanthus, *Catechu gambir* or Uncaria family of tea plants can also be used. Mixtures of unfermented and partially fermented teas can be used.

As used herein "flavanols" or "catechins" means primarily catechin, epicatechin, and their derivatives. These derivatives include the sugar salts, sugar esters, and other edible physiologically available derivatives. Green tea solids contain these flavanols. The preferred flavanols are catechin, epicatechin, gallocatechin, epigallocatechin, epicatechin gallate, and epigallocatechin gallate.

TEA EXTRACT

The tea extracts of the present invention contain unoxidized flavanols. These flavanols exhibit a strong tendency to cloud and produce sediment on storage. The sediment consists mainly of complexes of flavanols and caffeine. The flavanols impart the typical astringent character and color to the tea extract. It is known that the color of a tea extract is provided by the oxidation of the flavanols. The colored oxidation products are theaflavins and thearubigins. An aqueous tea extract can provide an extract have a color ranging from gray to golden to brown to rosy pink. It is also known that less astringent flavor is largely related to high theanine content. Both color and flavor of tea are influenced by the processing steps. Because of the variability of the starting tea extract and the nature of the processing, the control of color and flavor of the extract is an essential part of the present invention.

The extract can be obtained from tea materials or other natural sources. The tea extract may be obtained from either a single plant or mixtures of plants.

The extract is obtained by contacting green tea materials with an aqueous solution containing citric acid and erythorbic or ascorbic acid. Erythorbic acid and ascorbic acid can be used interchageably or mixtures of erythorbic and ascorbic may be used. However, it has been found that erythorbic acid is preferred for economical reasons. The extract is subsequently gelatin treated, clarified and concentrated. When the acids are used in combination with low temperatures, gelatin treatment, and concentration via evaporation an extract having very suitable properties for incorporating into non-tea matrixes is produced. Suprisingly the addition of citric acid with antioxidants such as erythorbic acid and ascorbic acid reduces the viscosity and improves the clarity of the tea extract and subsequently the tea containing beverage. An additional outcome is that the combination of citric acid and erythorbic acid and/or ascorbic acid reduces the oxidation of the flavanols.

Tea Materials

The tea materials may be obtained from the genus Camellia including *C. sinensis* and *C. assaimica.* The materials may be freshly gathered tea leaves, fresh green tea leaves that are dried immediately after gathering, fresh green tea leaves that have been heat treated before drying to inactivate any enzymes present, unfermented tea, instant green tea, partially fermented tea leaves and aqueous extracts of these leaves. Green tea materials which are tea leaves, their extracts, tea plant stems and other plant materials which are related and which have not undergone substantial fermentation to create black teas are suitable for use. Other members of the genus Phyllanthus, *Catechu gambir* or Uncaria family of tea plants can also be used. Mixtures of unfermented and partially fermented teas can be used in the present invention. The preferred tea materal are green tea leaves.

Erythorbic/Ascorbic Acid and Citric Acid

These are essential components which help to stabilize the tea containing extracts of the present invention. Ascorbic acid and erythorbic acid may be used interchangeably. The acids may be applied as an aqueous solution at any stage during the processing of the extract or may be added in dry form to the water used for extracting the tea material. However, there are specific points during the processing of the extract where the addition is most convenient or where the best conditions for maximum control of the browning exist. Preferably the extraction water is demineralized. Preferably the erythorbic acid is used alone in conjunction with citric acid.

Method for Making Tea Extract

The first step of the process for making the tea extract comprises contacting the tea materials with water containing erythorbic or ascorbic acid and citric acid. Any type of unfermented or partially fermented tea materials can be used in the present invention. Examples of unfermented teas are fresh tea leaves, green tea, and instant green tea. An example of partially fermented tea is Oolong tea. The leaves may be whole or comminuted, for example, a powder. In selecting a tea material for making extracts, one must be careful not to select teas that are over-oxidized. If the tea material has been over-oxidized during curing, fermenting or otherwise, there will be a greater percentage of insoluble substances and lesser percentage of unoxidized flavanols present in the final tea extract.

The amount of acids to be added to any particular tea material will depend upon the inherent color and flavor properties of the starting material and the color and flavor properties desired. Because of wide variations in tea materials, it is not possible to fix definite limits on the amounts of acid addition.

In order to provide a tea extract that is light in color and will not become cloudy once incorporated into a beverage, the mount, ratio and type of acids used in the process as well as the order of addition is extremely important. Also, It is important to prevent oxidation. Any oxidation will detract from the desired color, flavor, and stability of the resulting extract.

The extraction may be carded out batchwise, semicontinuously, continuously or by equivalent procedures. The preferred methods are batchwise or semicontinuous.

A. Batch Method

In the batch method, tea material is extracted at a temperature of from about 40° C. to about 50° C., preferably at a temperature of from about 45° C. to about 50° C. with an aqueous solution containing ¾ to about ½ of the total amount of erythorbic acid, ascorbic acid or mixtures thereof and the total mount of citric acid used in the extraction process. The ratio of tea material to aqueous solution is from about 1:7 to about 1:20, preferably the tea material to aqueous solution is at a ratio of from about 1:7 to about 1:9 and preferably, about 1:8. The ratio of erythorbic acid/ascorbic acid to tea material used in the process is from about 1:6 to about 1:10, preferably from about 1:7 to about 1:9 and most preferably about 1:8. The ratio of citric acid to tea material is from about 1:10 to about 1:34, preferably from about 1:20. These weights are based upon the weight of tea material and were found to be suitable to provide an appropriate modification of color and flavor, the actual amount used within these ranges will depend upon the characteristics of the initial starting material and the characteristics desired in the final product. The acids are weighed and dissolved in sufficient water to make an aqueous solution of the desired amount based on the weight of tea material. For example, if 10 grams of tea materials are used, 1.11 grams of erythorbic acid and 0.5 grams of citric acid are dissolved in 92 grams of water.

The extraction is carded out a period of time sufficient to produce an aqueous extract containing from about 0.75% to about 2.5% soluble solids, preferably from about 1% to about 2% soluble solids. The extract is separated from the tea materials and other solid tea residue, for example, by settling and decanting, filtration, or centrifugation.

Fresh water containing the remaining erythorbic/ascorbic acid is added to the tea material at a ratio of from about 1:7 to about 1:20 preferably from about 1:8 to about 1:15. The second extraction is carded out at temperature of from about 40° C. to about 48° C., preferably from a temperature of from about 43° C. to about 46° C. The extraction is carded out a period of time sufficient to produce an aqueous extract containing from about 0.5% to about 2.0% soluble solids, preferably from about 1.0 to about 1.5 soluble solids. After removing the tea material, the two extracts are pooled. The aqueous solution for the second extraction of the 10 grams of tea material above would contain 0.125 grams of erythorbic acid in 92 grams of water.

The volume of the combined extract is measured. The tea extract is then mixed with a 25% gelatin solution. The gelatin may be added as a powder however, it is not preferred. The amount of gelatin solution to be added to the extract is determined by the amount of tea solids present in the extract. The ratio of gelatin to tea solids suitable for clarifying the extract and reducing the astringent flavor is from about 1:2 to about 1:6, preferably from about 1:3 to about 1:5.

The extract which has been gelatin treated is cooled to a temperature of from about 10° C. to about 20° C., preferably 10° C. to about 15° C., and centrifuged with a nitrogen blanket or other inert gas. Care should be taken to reduce air entrainment and to maintain the temperature within this range.

After centrifuging the extract is evaporated at a temperature of from about 50° C. to about 80° C. to a solids content of from about 12% to about 60%, preferably from about 20% to about 50% solids.

B. Semi-Continuous Method

In preparing the tea extract, tea materials are extracted with an aqueous solution containing erythorbic acid, ascorbic acid or mixtures thereof and citric acid. The first step is adding from about ¾ to about ½ of the total amount of erythorbic acid, ascorbic acid or mixtures thereof to be used in the process and the total amount of citric acid to a tank containing water. Since the amount of acids to be added are based on the weight of tea material, the weight of tea material to be added is determined in advanced. The ratio of erythorbic and/or ascorbic acid to tea leaves is from about 1:6 to about 1:10, preferably from about 1:8; and the ratio of citric acid to tea material is from about 1:10 to about 1:34, preferably from about 1:20. The tea materials are then added to the aqueous solution containing the acids. The ratio of aqueous acid solution to tea material is from about 1:7 to about 1:20. The tea materials are completely wetted. The extraction is carried out at a temperature of from about 40° C. to about 50° C. preferably at a temperature of from about 45° C. to about 50° C. until solution reaches a Brix greater than 4. From about 60% to about 80%, preferably from about 65% to about 75% and most preferably 70% by weight of the solution (first portion) is pumped into a filter tank where additional water containing the remainder of the erythorbic acid, ascorbic acid or mixtures thereof are used to flush the filter. Water is added until the tea extract reaches a Brix of from about 1 to about 3, preferably from about 1.5 to about 2. It has been found that the ratios of erythorbic/ascorbic acid and citric acid are critical to the process. When substantially lower levels of erythorbic/ascorbic acid are used the ability to inhibit browning is reduced while at substantially higher levels additional benefits are minimal. Higher levels of citric acid produce an extract with undesirable color (red) while lower levels reduce the clarity of the resulting extract. After removal of the first portion of tea extract, the remainder of the tea solution (second portion) is used to extract another quantity of tea, thereby increasing the solids level.

The first portion is pumped under vacuum to limit the oxygen content of the extract to a vacuum tank where it is treated with gelatin to help clarify the extract, reduce the color and remove some of the harsh, astringent flavor. The volume of extract is measured. The tea extract is mixed with a 25% gelatin solution. The gelatin may be added as a powder however, it is not preferred. The amount of gelatin solution to be added to the tank is determined by the amount of tea solids present in the extract. The ratio of gelatin to soluble solids suitable for clarifying the extract and reducing the astringent flavor is from about 1:2 to about 1:6, preferably from about 1:3 to about 1:5. Higher levels of gelatin produce a bland tea flavor and decrease the amount of unoxidized flavanols in the resulting extract, while lower levels of gelatin produce a strong flavor and increase the amount of oxidized flavanols in the resulting extract.

The extract which has been gelatin treated is cooled to a temperature of from about 10° C. to about 20° C., preferably 10° C. to about 15° C., and centrifuged under an inert atmosphere, e.g. a nitrogen blanket. Care should be taken to reduce air entrainment and to maintain the temperature within this range. Incorporation of air and/or change in temperature produces undesirable results (i.e. oxidized flavanols, agglomeration of gelatin, browning of product).

After centrifuging the extract is evaporated preferably under reduced pressure, at a temperature of from about 500° C. to about 80° C. to a solids content of from about 12% to about 60%, preferably from about 20% to about 50% solids. Reduced pressure can be used in the evaporation process.

The resulting aqueous tea extract solution comprises from about 20% to about 60% solids, from about 3% to about 17%, preferably from about 5% to about 15% and more preferably from about 7% to about 11% erythorbic and ascorbic acid; from about 1% to about 6%, preferably from about 2% to about 5%, and most preferably from about 2.5% to about 3.3% citric acid; and from about 2% to about 6%, preferably from about 2.5% to about 5%, and most preferably from about 3% to about 4% flavanols from about 0.85% to about 3.2% caffeine. The theanine to caffeine ratio is from about 1:17 to about 1:200, preferably from about 1:50 to about 1:100, and more preferably from about 1:30 to about 1:60. The presence of increased theanine levels and reduced levels of oxidized flavanols provides a less astringent and harsh tasting extract. The ratio of theanine to oxidized flavanols in the resulting extract is from about 1:20 to about 1:150, preferably from about 1:30 to about 1:100, and more preferably from about 1:50 to about 1:70.

Optionally the extract can be dried to produce reconstitutable tea extract solids. Conventional drying means, such as freeze drying, vacuum belt drying and spray drying can be used to provide a substantially water-free, shelf stable powder which can be reconstituted. A concentrated extract suitable for drying preferably has from about 25% to about 60% soluble solids, preferably from about 30% to about 60% and more preferably from about 40% to about 60% soluble solids.

It is preferable during the above optional concentration and drying steps to not exceed a temperature of about 70° C., more preferably to not exceed a temperature of about 50° C.

EXAMPLE I.

102.1 kilograms of erythorbic acid and 40.8 kilograms of citric acid are added to 7,571 liters of water in a stainless steel tank at about 46° C. 816 kilograms of green tea fannings are added to the erythorbic acid/citric acid mixture and the mixture is allowed to brew for about 75 minutes. The resulting slurry is pumped to a filter and an additional 8,706 liters of water are used to flush the tea extract from the filter. The extract is clarified at a temperature of from about 40° C. to about 46° C. by adding 276 kilograms of a 25% aqueous solution of gelatin. The resulting mixture is coarse filtered through a U. S. Standard 100 mesh screen, chilled to a temperature of from about 10° C. to about 12° C., centrifuged at about 12000 rpm under a nitrogen atmosphere. The clarified extract is evaporated in a two stage evaporator to a solids level of about 55° brix. The resulting green tea concentrate is cooled to a temperature of about 21° C. and filled into a suitable container.

EXAMPLE 2

10 lbs of Chinese green tea fannings are slurried in 80 lbs. of deionized water containing about 567 grams of erythorbic acid and 227 grams of citric acid at a temperature of about 46° C. Once the tea leaves are completely wetted, the tea extract is withdrawn from the slurry by means of a tubular filter. Simultaneously fresh deionized water at a temperature of about 46° C. is pumped into the tank to replace the volume of extract removed. This extraction process is continued until the extract reaches a ° Brix of about 1%. The extract is removed from the tea slurry. After removing the second extract, the 1st and 2nd extracts are combined. The extract weighs about 225 lbs and contains about 1.95% soluble solids. The extract is mixed well with an aqueous gelatin solution containing about 233 grams of Hormel flavorset GP-7 gelatin and 700 grams of deionized water at a temperature of about 71° C. The extract containing the gelatin solution is cooled to a temperature of from about 10° C. to about 16° C., and centrifuged at 15,000 x g using a continuous centrifuge under a nitrogen blanket. The clarified tea extract is remove and concentrated under vacuum at a temperature of about 50° C. to a soluble solids content of about 40%.

This concentrate when diluted water to about 1.27% soluble solids has about 1230 ppm caffeine, about 4080 ppm flavanols, about 41 ppm theanine and about 0.6 ppm oxidized flavanols (theaflavins and thearubugins). It is free of gelatin (<1 ppm) as determined by capillary zone electrophoresis.

EXAMPLE 3

1800 lbs of Chinese green tea fannings are extracted in 2,000 gallons of deionized water containing 200 lbs of erythorbic acid and 90 lbs of citric acid at a temperature of 46° C. with stirring until the solution reaches a ° Brix of about 4.35. The slurry is pumped into a filter which separates the extract (1st extract) from the tea residue. 2,000 gallons of water containing 25 lbs of erythorbic acid at a temperature of about 46° C. is flushed through the filter containing the tea residue until the solution has a ° Brix of about 2.

The first extract (2,321 gallons) is combined under vacuum in a vacuum tank with an aqueous solution containing 126 lbs of Hormel, Flavorset GP-7 gelatin and 45 gallons of deionized water at a temperature of about 71 ° C. with stirring. This solution is cooled to a temperature of about 15.5° C. and centrifuged at 15,000 x g under a nitrogen blanket. Any solids are removed. The resulting clarified tea extract which has a ° Brix of about 3 and is concentrated under vacuum to about 53° Brix. This concentrate when diluted with water to 1.5% soluble solids contains 640 ppm caffeine, about 1942 ppm flavanols, about 30 ppm theanine and about 0.7 ppm oxidized oxidized flavanols (theaflavins and thearubugins).

What is claimed is:

1. A process for producing a tea product comprising the steps of:
   (a) contacting green tea materials with an aqueous acid solution comprising erythorbic acid or ascorbic acid and citric acid and mixtures thereof, at a ratio of tea materials to acid solution, of from about 1:7 to about 1:20, at a temperature of from about 40° C. to about 50° C. for a period of time sufficient to produce an aqueous extract containing from about 0.75% to about 2.5% by weight, soluble solids; the ratio of erythorbic or ascorbic acid to tea material being from about 1:6 to about 1:10, and the ratio of citric acid to tea material being from about 1:10 to about 1:34;
  (b) separating the aqueous extract of step (a) from solid tea leaves residue;
  (c) contacting the solid tea material residue of step (b) with acidified water comprising erythorbic or ascorbic acid, at a ratio of tea material to aqueous solution, of from about 1:7 to about 1:30, at a temperature of from about 40° C. to about 48° C. for a period of time sufficient to produce an aqueous extract containing from about 0.50% about 2.0% by weight, soluble solids;
  (d) separating the aqueous extract of step (c) from the solid tea residue;
  (e) mixing the extracts from step (b) and (d) at a temperature of from about 40° C. to about 50° C., with a 25% by weight gelatin solution, wherein the ratio of said gelatin to soluble solids is from about 1:2 to about 1:7;
  (f) cooling the aqueous tea extract from step (e) to a temperature of from about 10° C. to about 20° C.;
  (g) separating any solid precipitate from the cooled extract of step (f) under an inert atmosphere;

2. The process of claim 1, wherein the ratio of tea leaves to water in steps (a) and (c) is from about 1:7 to about 1:9, the temperature in step (a) is from about 45° C. to about 50° C., and the temperature in step (e) is from about 43° C. to about 46° C.

3. The process of claim 2, wherein the acids are erythorbic acid and citric acid.

4. The process of claim 2, wherein the acids are ascorbic acid and citric acid.

5. The process of claim 3, wherein the separation of step (h) is achieved by centrifugation.

6. The process of claim 4 wherein the tea extract is concentrated to a solids content of from about 35% to about 50% soluble solids.

7. The process of claim 4 wherein the tea extract is dried.

8. A stable tea product prepared according to the process of claim 1 comprising:
  (a) from about 20% to about 60% solids;
  (b) from about 3% to about 17% erythorbic acid, ascorbic acid or mixtures thereof;
  (c) from about 1% to about 6% citric acid;
  (d) from about 2% to about 6% flavanols;
  (e) caffeine;
  (f) theanine; wherein the theanine to caffeine ratio is from about 1:17 to about 1:200; and
  (g) water.

9. The product of claim 8 wherein said erythorbic acid or said ascorbic acid and mixtures thereof is from about 5% to about 11%.

10. The product of claim 9 wherein said theanine to caffeine ratio is from about 1:30 to about 1:60.

11. The dried product of claim 8.

12. The dried product of claim 9.

13. The dried product of claim 10.

14. A process for producing a tea product comprising the steps of:
  (a) contacting green tea materials with an aqueous acid solution comprising erythorbic acid or ascorbic acid and citric acid and mixtures thereof, at a ratio of tea materials to acid solution, of from about 1:7 to about 1:20 until said tea material is completely wetted, at a temperature of from about 40° C. to about 50° C. for a period of time sufficient to produce an aqueous extract containing at about 3.5% by weight, soluble solids; the ratio of erythorbic or ascorbic acid to tea material being from about 1:6 to about 1:10, and the ratio of citric acid to tea material being from about 1:10 to about 1:34;
  (b) separating and removing from about 60% to about 80% by weight of the aqueous extract of step (a) from solid tea leaves residue while simultaneously adding an aqueous solution containing erythorbic or ascorbic acid, or mixtures thereof for a period of time sufficient to produce and aqueous extract containing from about 1% to about 3% soluble solids;
  (c) mixing the extract at of step (b) at a temperature of from about 40° C. to about 50° C., with a 25% by weight gelatin, wherein the ratio of said gelatin to tea solids is from about 1:2 to about 1:7;
  (d) cooling the aqueous tea extract from step (c) to a temperature of from about 10° C. to about 20° C.;
  (e) separating any solid precipitate from the cooled extract of step (d) under an inert atmosphere;

15. The process of claim 14, wherein the ratio of tea material to aqueous solution is from about 1:8.

16. The process of claim 14, wherein the acids are erythorbic acid and citric acid.

17. The process of claim 14, wherein the acids are ascorbic acid and citric acid.

18. The process of claim 14, wherein the separation of step (c) is achieved by filtration.

19. The product of claim 17 wherein the tea extract is concentrated to a solids content of from about 35% to about 50% soluble solids.

20. The product of claim 18 wherein the tea extract comprises from about to about 8% erythorbic acid; from about 1% to about 6% citric acid; from about 2% to about 5% flavanols; from about 0.85% to about 3.2% caffeine; theanine; and water; wherein the ratio of theanine to caffeine is from about 1:17 to about 1:200.

21. The dried product of claim 20.

* * * * *